United States Patent [19]

Stoner

[11] Patent Number: 5,736,170
[45] Date of Patent: Apr. 7, 1998

[54] APPARATUS FOR BLOW MOLDING INTERLOCKING DRINK CONTAINERS

[76] Inventor: Theodore A. Stoner, 1660 S. Alibion St., Ste. 309, Denver, Colo. 80222

[21] Appl. No.: 638,955

[22] Filed: Apr. 24, 1996

Related U.S. Application Data

[63] Continuation-in-part of Ser. No. 348,049, Dec. 1, 1994.
[51] Int. Cl.$^6$ .................................................. B29L 49/70
[52] U.S. Cl. .................. 425/537; 425/522; 425/DIG. 58
[58] Field of Search .............................. 425/537, 444, 425/522.1, DIG. 58

[56] References Cited

U.S. PATENT DOCUMENTS

| | | | |
|---|---|---|---|
| 3,369,658 | 2/1968 | Hasselmann | 220/23.4 |
| 3,374,917 | 3/1968 | Troy | 220/23.4 |
| 3,541,640 | 11/1970 | Stefaniak et al. | 425/537 |
| 5,454,708 | 10/1995 | Boenig et al. | 425/537 |
| 5,480,607 | 1/1996 | Hobson | 425/444 |

FOREIGN PATENT DOCUMENTS

| | | | |
|---|---|---|---|
| 220099 | 11/1957 | Australia | 425/522 |
| 0306923 | 3/1989 | European Pat. Off. | 425/522 |
| 60-149428 | 8/1985 | Japan | 425/522 |
| 1-225529 | 9/1989 | Japan | 425/522 |
| 5-96612 | 4/1993 | Japan | 425/522 |
| 1256979 | 9/1986 | U.S.S.R. | 425/444 |
| 1380988 | 3/1988 | U.S.S.R. | 425/444 |

*Primary Examiner*—Robert Davis
*Attorney, Agent, or Firm*—Edwin H. Crabtree; Ramon L. Pizarro; Donald W. Margolis

[57] ABSTRACT

An apparatus and method for blow molding interlocking drink containers. Each container having a hollow container body with a top including an upwardly tapered neck and an opening into the hollow body, a bottom, a first side with an upper and a lower male lug, a second side with an upper and a lower female cavity and a third and a fourth side. The apparatus includes a split mold having a male block and a female block. The female block used for forming the first side of the container with male lugs and a portion of the third and fourth sides and a portion of the top and bottom of the container. The male block used for forming the second side of the container with female cavities and a portion of the third and fourth sides and a portion of the top and bottom of the container. The apparatus also including an ejector assembly positioned in the male block for engaging the interior of the female cavities in the second side of the container and ejecting the container in an upright position after the container has been molded and the split mold opened for discharging the container therefrom. The male block includes ribs on upper and lower male protrusions. The protrusions are used to form the female cavities in the second side of the container. The ribs provide a gripping action for retaining the completed container in the male block when the split mold is opened and prior to discharging the container.

14 Claims, 2 Drawing Sheets

APPARATUS FOR BLOW MOLDING INTERLOCKING DRINK CONTAINERS

This application is a continuation-in-part application of patent application Ser. No. 08/348,049, title "INTERLOCKING DRINK CONTAINERS AND RELATED PACKAGING", filed on Dec. 1, 1994 by the subject inventor, Theodore A. Stoner.

BACKGROUND OF THE INVENTION (a) Field of the Invention

This invention relates to blow molded containers and more particularly, but not by way of limitation, to the apparatus and method for efficiently producing blow molded interlocking drink containers used as building blocks by children at play.

(b) Discussion of Prior Art

Heretofore there have been a variety of different types of drink containers that are interlocking and used for holding a liquid therein. In German Patent 2,713,543 to Nagel, a plurality of hollow packaging container are disclosed for use as a toy building blocks. Each container includes square or round bosses with dovetail cross-sectional profiles which are designed for receipt in longitudinal grooves with a dovetail cross-sectional profiles in an opposite side of another container. In U.S. Pat. No. 4,691,828 to Slusarczyk et al. a container for liquids is described with a pair of upstanding posts. The posts are received inside recesses of an adjacent container and in this manner the containers can be used as interlocking toy blocks.

In U.S. Pat. Nos. 3,374,917 to Troy, 4,133,445 to Mandelbaum, 4,889,254 to Vola, 4,919,296 to Kirsh et al., 4,925,066 to Rosenbaum, 4,708,253 to Mednis, 3,369,658 to Hasselmann, 5,392,945 and Des. 356,255 to Syrek French Patent 2,395,905 to Mira and German Patent 2,729,285 to Hugel various types of stackable and portable containers, boxes, pill dispensers and storage devices are described having interlocking features.

None of the above mentioned patents specifically describe or illustrate the unique apparatus and method for blow molding interlocking drink containers as described herein.

SUMMARY OF THE INVENTION

In view of the foregoing, it is an object of the present invention to provide an apparatus for producing containers which can be used for providing adults and children fruit drink and other types of beverages and consumer edible and non-edible products and the containers can also be used as play objects before and after the use of the product in the containers.

Another object of the invention is to mass produce containers which are interlocking and by using two or more containers can be quickly connected as building blocks in a side by side relationship, end to end relationship, a right angle relationship, one on top of the other relationship and various other combinations. Some of these combination popularly called "stacking" and "cross blocking" of the containers.

A primary object of the apparatus is to provide a split mold with an ejector assembly which can quickly form the container and eject the completed blow molded container with a minimum of ejector impact and dispense the container in a controlled and upright manner.

Still another object of the apparatus is the forming of a rib on male protrusions in the male block for gripping and retaining the female cavities of the container and holding the container in the male block prior to ejecting the completed blow molded container.

In summary the apparatus includes a split mold having a male block and a female block. The female block used for forming the first side of the container with male lugs and a portion of the third and fourth sides and a portion of the top and bottom of the container. The male block used for forming the second side of the container with female cavities and a portion of the third and fourth sides and a portion of the top and bottom of the container. The apparatus also including an ejector assembly positioned in the male block for engaging the interior of the female cavities in the second side of the container and ejecting the container in an upright position after the container has been molded and the split mold opened for discharging the container therefrom. The male block includes ribs on upper and lower male protrusions. The protrusions are used to form the female cavities in the second side of the container. The ribs provide a gripping action for retaining the completed container in the male block when the split mold is opened and prior to discharging the container.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
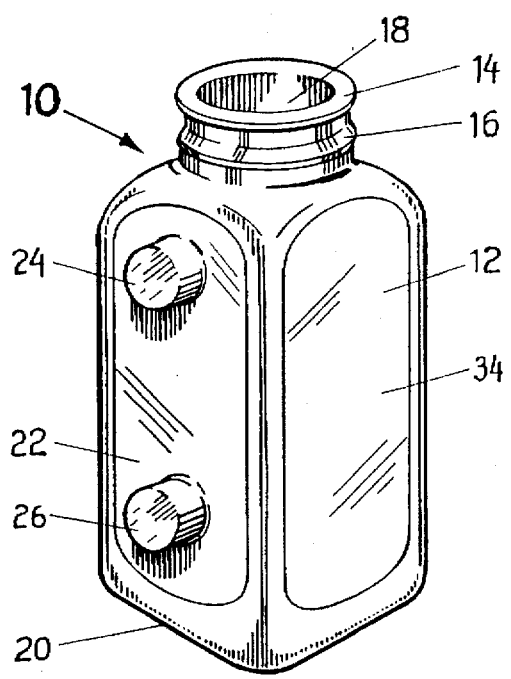
FIG. 1 is a front perspective view of one embodiment of the interlocking container showing a first side with two male lugs extending outwardly therefrom.

In FIG. 1, a front perspective view of one of the interlocking containers is shown having a general reference numeral 10. The containers 10 may be made of a thermoplastic resin or like materials commonly used in blow molding for the beverage industry. The containers 10 shown in the drawings may be in the form of a bottle or like object for holding different types of food products. The subject interlocking container 10 includes a hollow container body 12 with a top 14 including a tapered neck 16 and an opening 18 therein for access to the interior of the hollow body 12, a bottom portion 20, and a first side 22 with an annular shaped first male lug 24 and an annular shaped second male lug 26 extending outwardly therefrom.

Figure 2:
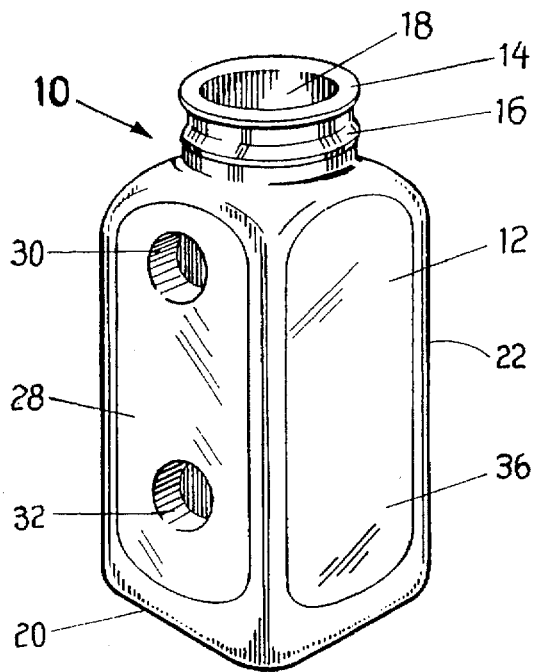
FIG. 2 is a rear perspective view of the container shown in FIG. 1 showing a second side with two female cavities therein.

In FIG. 2, a rear perspective view of the container 10 is shown having a second side 28 with an annular shaped first female cavity 30 and an annular shaped second female cavity 32 therein. The second side 28 is on the opposite side of the container 10 from the first side 22. A third side 34 is shown in FIG. 1 and a fourth side portion 36 is shown in FIG. 2. It should be mentioned that while throughout this discussion of the subject invention the container 10 is described as shown in FIGS. 1 and 2, it can be appreciated that various types of containers 10 can be blow molded with different combinations of male lugs and female cavities in formed the both the first and second sides of the container along with cavities formed in the third and fourth sides of the container without departing from the spirit and scope of the invention.

Figure 3:
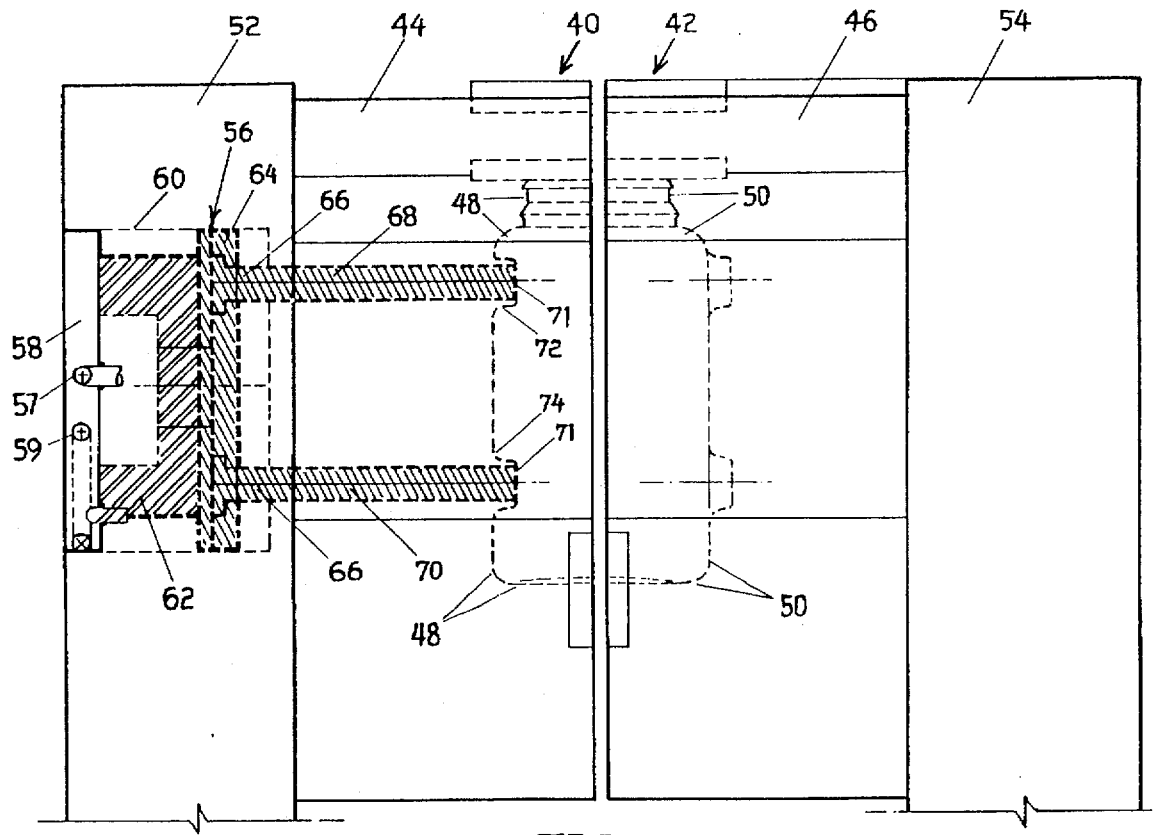
FIG. 3 is a front view of a split mold used to blow mold the container. The split mold is shown in a closed position and having a female block and a male block with ejector assembly. The ejector assembly is used for discharging the container from the mold after blow molding the container therein.

In FIG. 3, a front view of an apparatus used in blow molding the container 10 is shown and having general reference numeral 40. The apparatus 40 includes a split mold which has a general reference numeral 42. The split mold 42 has a male block 44 and a female block 46 with cutout interiors contoured for blow molding the container 10 therein. A cutout interior, shown as dotted lines 48, in the male block 44 is used to form the second side 28 of the container 10 with female cavities 30 and 32 and a portion of the top 14, a portion of the bottom 20 and a portion of the third and fourth sides 34 and 36. Likewise a cutout interior, shown as dotted lines 50, in the female block 46 is used to form the first side 22 of the container 10 with male lugs 24 and 26 and a portion of the top 14, a portion of the bottom 20 and a portion of the third and fourth sides 34 and 36.

A male backing plate 52 is attached to the male block 44 and is used to support the male block 44 thereon and also used to move the male block 44 into a closed position with the female block 46 for receiving a plastic resin drop into the top of the male and female blocks 44 and 46 for blow molding the container 10 therein. The female block 46 is attached to a female backing plate 54 which is also used for moving the female block 46 into a closed position with the male block 44. Also, the first and second backing plates 52 and 54 are used to move the male and female blocks 44 and 46 into an open position as shown in FIG. 4 for releasing the completed container 10 therefrom.

The male backing plate 52 and male block 44 are characterized by including an air operated ejector assembly having a general reference numeral 56. The assembly 56 includes an air line plate 58, an air intake port 57 and an air discharge port 59. The air line plate 58 is slidable received in a cylinder 60 formed in a portion of the male backing plate 52. A piston 62 rides inside the cylinder 60 and is attached to a pin guide arm 64. The pin guide arm 64 is attached to a first end 66 of a pair of horizontal ejector pins 68 and 70. The pins 68 and 70 are received through the male block 44 with a second end 71 of the pins 68 and 70 received through a pair of male protrusion 72 and 74. The male protrusion 72 and 74 are used for forming the female cavities 30 and 32 in the second side 28 of the container 10.

Figure 4:
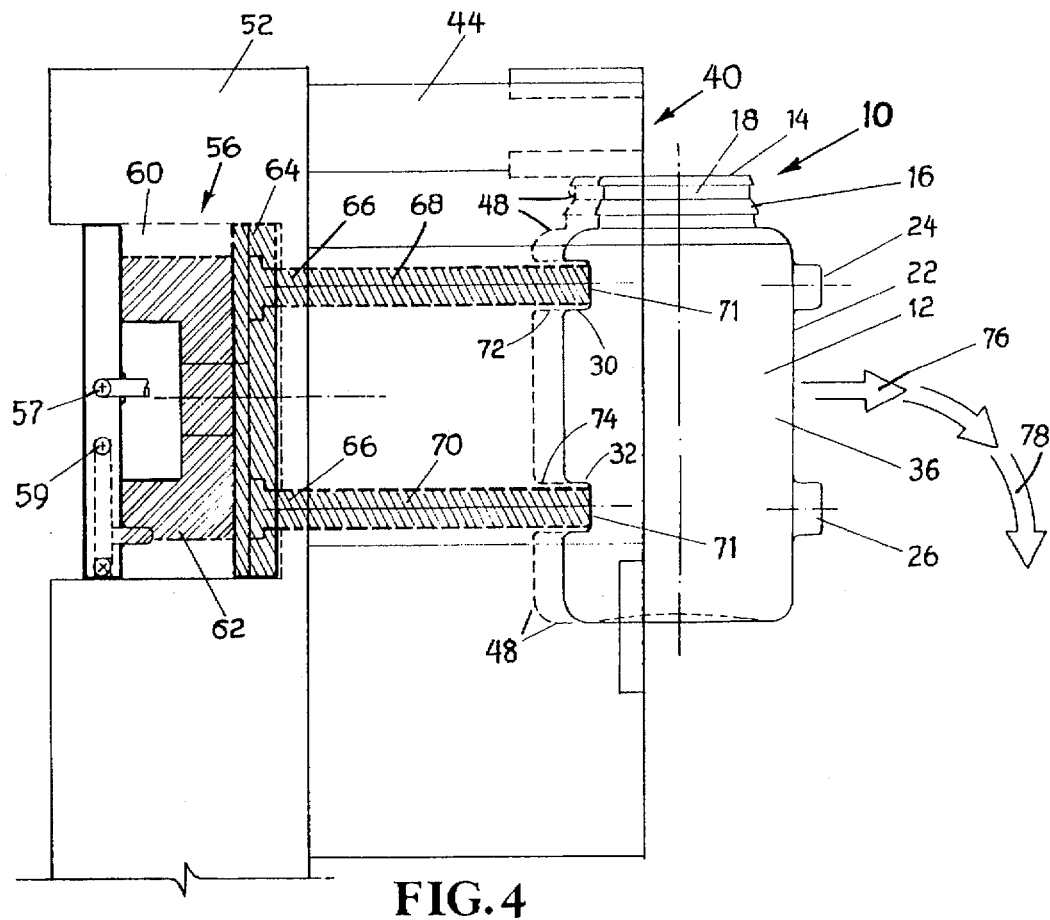
FIG. 4 is a front view of the container being discharged from the male block after the male and female block have been opened and the ejector assembly actuated for engaging the female cavities in the second side of the container.

In FIG. 4, the female block 46 is moved from left to right and the split mold 42 is in an open position for ejecting the container 10. Through the use of the apparatus 40 with the split mold 42, the containers 10 can be blow molded quickly, efficiently and produced in mass quantities. During test runs of using the split mold 42, it became obvious that to avoid the tilting of the container 10 and the haphazard ejecting of the container 10 at various angles of discharge from either the male or female blocks 44 and 46, it was necessary to eject the container 10 horizontally, as shown by arrow 76, and in a controlled upright manner from the male block 44. When this is done, the container 10 then drops vertically, as shown by arrow 78, into a shoot and onto a transport conveyor for spin trimming.

The successful ejecting of the container 10 from the male block 44 is accomplished by the use of the ejector assembly 56. When the blow molding of the container 10 is completed using the split mold 42, the male and female blocks 44 and 46 are opened. At this time, high pressure air is introduced through air intake port 57 and piston 62 is compressed in cylinder 60 moving left to right and actuating the ejector pins 68 and 70. At this time, the pins 68 and 70 engage the interior of the female cavities 30 and 32 of the container 10. It has been found that during the molding of the container 10, the interior of the cavities 30 and 32 is the strongest structural part of the container 10 and therefore can resist the force of the impact of the ends 66 of the pins 68 and 70 thereagainst without damage to the container 10. While the ejector pins 68 and 70 are shown engaging the cavities 30 and 32, it can be appreciated that the second side 28 of the container 10 could be engaged between the cavities 30 and 32. This however would would have greater impact on the container 10 with potential distortion to the second side 28 including the female cavities 30 and 32.

In FIG. 4, the ejector assembly 56 has been actuated and the pins 68 and 70 have moved the container 10 horizontally and outwardly from the male block 44 as indicated by arrow 76. The impact of the pins 68 and 70 is sufficient to free the container 10 from the male block 44 in an upright position until the container 10 starts a free fall by gravity downward as indicated by arrow 78. At this time, the ejector assembly 56 is retracted with the compressed air discharged through discharge port 59. The male and female blocks 44 and 46 are again closed and the method of making the containers 10 is again repeated as described above.

Figure 5:
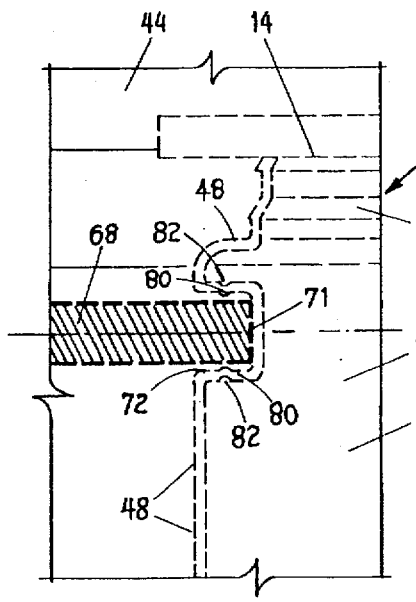
FIG. 5 is an enlarged front view of a portion of the male block with one of the male protrusions in the interior of the male block having a rib thereon used for gripping and holding the container in the male block prior to the ejector assembly being actuated.

In FIG. 5, an enlarged front sectional view of the male 44 is shown with a portion of the ejector pin 68. In this view, the second end 71 of the ejector pin 68 has moved from a retracted position inside the male protrusion 72 and engaging the first female cavity 30 of the container 10. In insure that the container 10 is held in place inside the male block 44 when the split mold 42 is opened as shown in FIG. 4, an inverted rib 80 is formed around the male protrusion 72. An inverted rib 80 is also formed around the male protrusion 74 but is not shown in the drawings. When the container 10 is blow molded in the split mold 42, the plastic resin is received in the inverted rib 80 forming a rib 82 on the interior of the female cavities 30 and 32. As the plastic cools and shrinks, the ribs 82 grip the sides of the male protrusions 72 and 74 and hold the container 10 inside the male block 44. When the split mold 44 is opened, the container 10 remains with the male block 44 as shown in FIG. 4 and prior to being completely ejected and dispensed using the ejector assembly 56.

Figure 6:
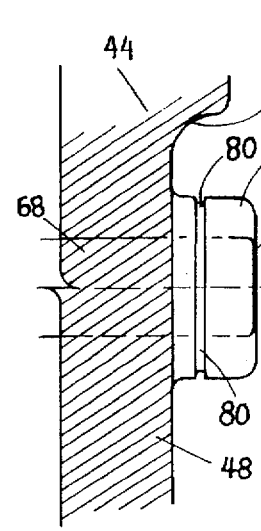
FIG. 6 is an enlarged sectional view of one of the male protrusions in the male block with a portion of an ejector pin received therethrough and in a retracted position. The male protrusion is shown with an inverted rib therearound.

In FIG. 6 an enlarged sectional view of the male protrusion 72 is shown in the male block 44. In this view, a portion of an ejector pin 68 is received through the male protrusion 72 and rests in a retracted position. The male protrusion 72 is shown with the inverted rib 80 therearound.

Figure 7:
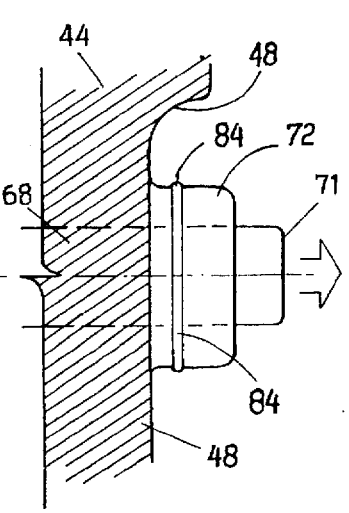
FIG. 7 is an enlarged sectional view of one of the male protrusions in the male block with a portion of an ejector pin received therethrough and in an extended position. The male protrusion is shown with an outstanding rib therearound. The rib may be either inverted or outstanding on the male protrusion and is independent of the position of the ejector pin.

FIG. 7 is an enlarged sectional view of the male protrusion 72 in the male block 44 with a portion of an ejector pin 68 received therethrough and in an extended position. The male protrusion 72 is shown with an outstanding rib 84 therearound. The outstanding rib 84 acts in the same manner as the inverted rib 80 for forming ribs inside the female cavities 30 and 32 and used for gripping and retaining the container 10 inside the male block 44 prior to ejection therefrom.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. An apparatus for blow molding interlocking drink containers, each container having a hollow container body with a top including an upwardly tapered neck and an opening into the hollow body, a bottom, a first side with an upper and a lower male lug, a second side with an upper and a lower female cavity and a third and a fourth side, the apparatus comprising:

a split mold having a male block and a female block, said female block when in a closed position with said male block used for forming the first side of the container with male lugs and a portion of the third and fourth sides and a portion of the top and bottom of the container;

said male block used for forming the second side of the container with female cavities and a portion of the third and fourth sides and a portion of the top and bottom of the container; and ejector means positioned in said male block, said ejector means when actuated for engaging the female cavities in the second side of the container and for ejecting the container in a controlled upright position after the container has been molded and said split mold opened for discharging the container therefrom.

2. The apparatus as described in claim 1 wherein said ejector means is an air operated ejector assembly having a pair of ejector pins, when said ejector assembly is actuated said ejector pins engaging the interior of the female cavities in the second side of the container for discharging the container from said split mold.

3. The apparatus as described in claim 2 wherein a portion of said ejector pins is received through upper and lower male protrusions in said male block, said upper and lower male protrusions used for forming the upper and lower female cavities in the second side of the container.

4. The apparatus as described in claim 1 wherein said male block includes upper and lower male protrusions used for forming the upper and lower female cavities in the second side of the container, said male protrusions having a rib thereon for forming a rib in the upper and lower female cavities and gripping the container to said male protrusions when blow molded therein.

5. The apparatus as described in claim 4 wherein said rib is an inverted rib on said male protrusions.

6. The apparatus as described in claim 4 wherein said rib is an upstanding rib on said male protrusions.

7. An apparatus for blow molding interlocking drink containers, each container having a hollow container body with a top including an upwardly tapered neck and an opening into the hollow body, a bottom, a first side with at least one male lug, a second side with at least one female cavity and a third and a fourth side, the apparatus comprising:

a split mold having a male block and a female block, said female block when in a closed position with said male block used for forming a first half of the container with male lug;

said male block used for forming a second half of the container with female cavity; and ejector means positioned in said male block, said ejector means when actuated for engaging the female cavity in the second side of the container and for ejecting the container in a controlled upright position after the container has been molded and said split mold opened for discharging the container therefrom.

8. The apparatus as described in claim 7 wherein said ejector means is an air operated ejector assembly having at least one ejector pin, when said ejector assembly is actuated said ejector pin engaging the interior of the female cavity in the second side of the container for discharging the container from said split mold.

9. The apparatus as described in claim 8 wherein a portion of said ejector pin is received through a male protrusion in said male block, said male protrusion used for forming the female cavity in the second side of the container.

10. The apparatus as described in claim 9 wherein said male protrusion includes a rib thereon for forming a rib in the female cavity, said rib used for gripping the container to said male protrusion when the container is blow molded in said split mold.

11. The apparatus as described in claim 10 wherein said rib is an inverted rib on said male protrusion.

12. The apparatus as described in claim 10 wherein said rib is an upstanding rib on said male protrusion.

13. The apparatus as described in claim 7 wherein said female block has a contoured interior used for forming the first side of the container with male lug and a portion of the third and fourth sides and a portion of the top and bottom of the container.

14. The apparatus as described in claim 7 wherein said male block has a contoured interior used for forming the second side of the container with female cavity and a portion of the third and fourth sides and a portion of the top and bottom of the container.

* * * * *